United States Patent [19]
Leon

[11] Patent Number: 5,651,284
[45] Date of Patent: Jul. 29, 1997

[54] STRAIN GAGE METHOD FOR MEASURING THRUST AND TORQUE ON VALVE STEMS THAT DOES NOT REQUIRE CALIBRATIONS AGAINST A KNOWN THRUST AND TORQUE

[75] Inventor: Robert L. Leon, Maple Glen, Pa.

[73] Assignee: Liberty Technologies, Inc., Conshohocken, Pa.

[21] Appl. No.: 493,660

[22] Filed: Jun. 22, 1995

[51] Int. Cl.$^6$ ........................................ G01L 1/22
[52] U.S. Cl. .................. 73/150 A; 72/1 B; 72/842; 72/865.7
[58] Field of Search .................. 73/150 A, 775, 73/841, 842, 847, 856, 865.9, 1 B

[56] References Cited

U.S. PATENT DOCUMENTS

| | | | |
|---|---|---|---|
| 2,553,986 | 5/1951 | Statham | 73/150 A |
| 4,805,451 | 2/1989 | Leon | 73/168 |
| 4,911,004 | 3/1990 | Leon | 73/168 |
| 5,347,871 | 9/1994 | D'Andrea et al. | 73/775 |

*Primary Examiner*—Richard Chilcot
*Assistant Examiner*—Ronald Biegel
*Attorney, Agent, or Firm*—Panitch Schwarze Jacobs & Nadel, P.C.

[57] ABSTRACT

A method for detecting the integrity of a bond between strain gages and the circumferential surface of a rod having an intended use comprises bonding at least four strain gages to the surface of the rod in a predetermined orientation, each of the strain gages being connected to a separate strain gage bridge circuit. The rod is used for its intended use and each of the strain gage bridge circuit outputs a plurality of instantaneous first, second, third and fourth output signals, each being associated with one of the strain gages. A plurality of instantaneous bonding values are calculated from the output signals equal to the sum of the first signal and the fourth signal minus the sum of the second signal and the third signal. If the instantaneous bonding values remain constant, the bond integrity of the strain gages is good whereas if the bonding values are not constant, the bond integrity of at least one of the strain gages is poor.

26 Claims, 6 Drawing Sheets

STRAIN GAGE METHOD FOR MEASURING THRUST AND TORQUE ON VALVE STEMS THAT DOES NOT REQUIRE CALIBRATIONS AGAINST A KNOWN THRUST AND TORQUE

FIELD OF THE INVENTION

This invention generally relates to an improved method of strain gaging a valve stem for measuring thrust and torque, the method providing a means for independently verifying the bond integrity beneath the strain gages, thereby allowing a user to confidently rely upon known factors of the strain gages to compute sensitivities for measuring thrust and torque in the stem.

BACKGROUND OF THE INVENTION

It is often important in power plants and process plants to verify the thrust and torque developed in the valve stems of motor operated valves. It may be to assure that the valve develops sufficient stem thrust to be able to close off the flow in an emergency situation, or it may be to assure that the stem lubrication is still good. Stem lubrication will be good if the torque to thrust ratio, or stem factor, has not increased unduly over time.

U.S. Pat. Nos. 4,805,451 and 4,911,004 describe a method and apparatus for measuring valve stem thrust. The apparatus employs a special extensometer affixed to the valve yoke. The extensometer is calibrated by temporarily affixing a special diametral strain sensing device to the valve stem just as the valve is seated. An important advantage of the method is that it can be universally applied to valves having all types of exposed stems, both threaded and unthreaded. Nevertheless, the method only measures stem thrust, not stem torque, and it measures stem thrust with accuracies not much better than ±10%.

For a subset of the above total population of motor operated valves, it is possible to apply strain gages to the stem because the stems have an unthreaded (smooth) portion which remains exposed throughout the total valve stroke. Strain gages allow both torque and thrust to be measured. U.S. Pat. No. 5,347,871 describes a single strain gage coupon which is bonded to a valve stem. The coupon contains strain gage elements that form two separate and independent bridge circuits, one for thrust and one for torque. The coupon must be substantially longer than half the circumference of the valve stem so that a spring clamp temporarily attached to protuberances at its ends will exert both circumferential and radial forces for bonding the coupon to the valve stem. Also, the coupon length must be specific to each particular valve stem diameter so that certain of the elements will be spaced 180 degrees apart on the stem so as to cancel out any stem bending effects.

Ideally, the strain gage bridges should be calibrated after being bonded to the valve stem. That is, their outputs should be checked against a known thrust input and a known torque input. In practice, this is difficult to do for the thrust, and even more difficult to do for the torque. The end result is that often these calibrations are not performed. Instead, one just computes the sensitivities of the thrust bridge and the torque bridge using the known gage factors of the strain gage elements, the known diameter of the stem, and the known properties of the stem material. By computing these sensitivities rather than calibrating to obtain them, one effectively assumes that the bond beneath each strain gage element is perfect. If the bond beneath each strain gage element is indeed perfect, then accuracies in the order of ±5% should be achievable. The problem, though, is that sometimes the bonds are not perfect, and instead of achieving about ±5% accuracy, the computed sensitivities may be inaccurate by ±25%, ±50%, or even more. Worse yet, with independent thrust and torque bridges, when the bond beneath a strain gage element is not perfect, the user has no way of knowing that.

Accordingly, there is still a need for technique to verify the bond integrity beneath each strain gage so that true ±5% accuracies can be achieved without having to perform a very difficult calibration procedure where known thrusts and known torques must be applied. The technique should be readily applicable to the valve stem of motor operated valves. The present invention fills such needs by providing methods of employing strain gages whose signal outputs are "directly employed" to verify the bond integrity, and if the bond integrity is acceptable, the signal outputs are employed to make thrust and torque measurements and determine stem bending moments.

SUMMARY OF THE INVENTION

Briefly stated, the present invention comprises a method for detecting the integrity of a bond between strain gages and the circumferential surface of a rod having an intended use. The method comprises the steps of: bonding at least four strain gages to the surface of the rod, first and second strain gages being on one side of the surface of the rod and third and fourth strain gages being on the opposite side of the surface of the rod with all four gages being oriented at the same angle with respect to the rod axis, the angle being different than 0° and 90°, the first and third strain gages having a sensing axis which slopes from a lower left to an upper right direction and the second and fourth strain gages having a sensing axis which slopes from an upper left to a lower right direction, each of the strain gages being connected to a separate strain gage bridge circuit; using the rod for the intended use; outputting from the strain gage bridge circuits a plurality of instantaneous first, second, third and fourth output signals resulting from using the rod, each output signal being associated with the first, second, third and fourth strain gage, respectively; calculating a plurality of instantaneous bonding values from the output signals equal to the sum of the first signal and the fourth signal minus the sum of the second signal and the third signal; and detecting whether the instantaneous bonding values are constant, constant bonding values indicating that the bond integrity of the strain gages is good and non-constant bonding values indicating that the bond integrity of at least one of the strain gages is poor.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

3

DETAILED DESCRIPTION OF PREFERRED EMBODIMENTS

Certain terminology is used in the following description for convention only and is not limiting. The words "right," "left," "lower," "upper," "top" and "bottom" designate directions in the drawings to which reference is made.

The present invention is directed to a novel scheme of using strain gages on a valve stem and then manipulating the resulting time records to obtain reasonably accurate scaled traces of thrust versus time and torque versus time, without having to perform separate calibrations where a known thrust and a known torque was applied. In the following discussion, reference is made to a preferred system capable of conditioning, acquiring, and combining the gage output signals, and displaying the resulting comined traces. However, it should be understood that the present invention is still applicable using other system elements performing similar functions.

Figure 1:
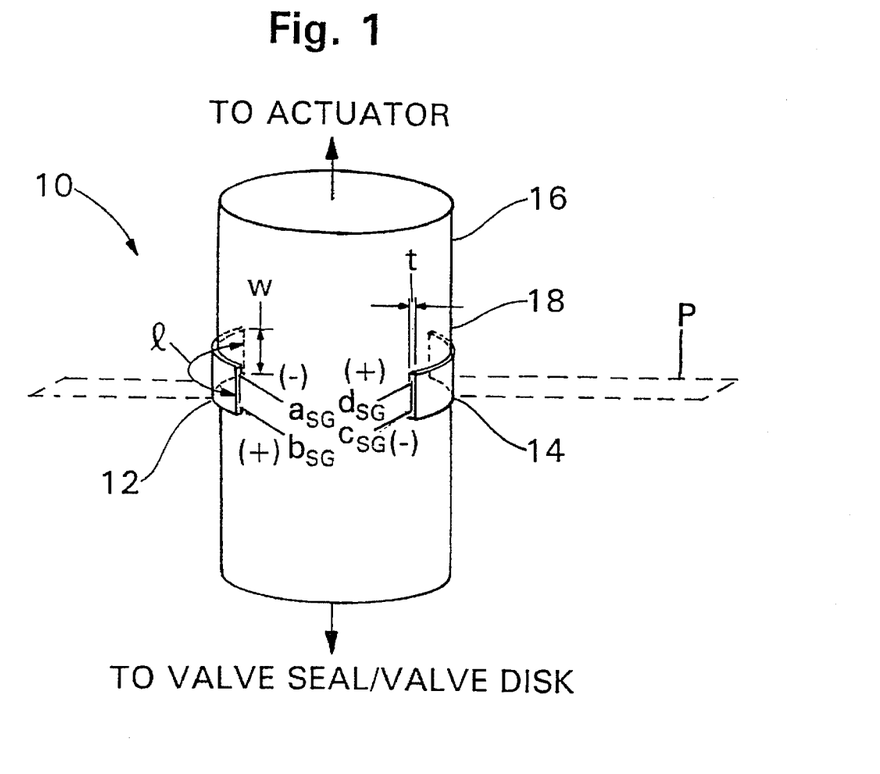
FIG. 1 is a perspective view of a portion of a valve stem showing two strain gage coupons which form a strain gage installation bonded thereto.

FIG. 1 shows a strain gage installation, labelled as 10, in accordance with the invention. The strain gage installation includes two substantially identical strain gage coupons 12 and 14 bonded to opposite sides of a cylindrical rod 16 which is to be analyzed. More specifically, the strain gage coupons 12 and 14 are cemented or epoxied rigidly to the surface 18 of the rod 16. Preferably, the centers of the coupons 12 and 14 lie in a common plane P taken perpendicular to the longitudinal axis of the cylindrical rod 16. In the example disclosed herein, the cylindrical rod 16 is a valve stem and is referred to hereafter as "valve stem 16." Each of the strain gage coupons 12 and 14 is generally rectangular in a top plan view and defined by width, w, length, l (the length, l, defining the principal axis of the coupon when the coupon is laid flat) and thickness, t. As described more fully in FIGS. 3–5 below, there are two strain gages embedded in each coupon so that each coupon provides two separate, independent outputs. Coupon 12 provides raw output signals ($a_{SG}$) and ($b_{SG}$), and coupon 14

4 provides raw output signals ($c_{SG}$) and ($d_{SG}$). (The (+) and (−) symbols are described below. They do not refer to signal polarity.)

Figure 2:
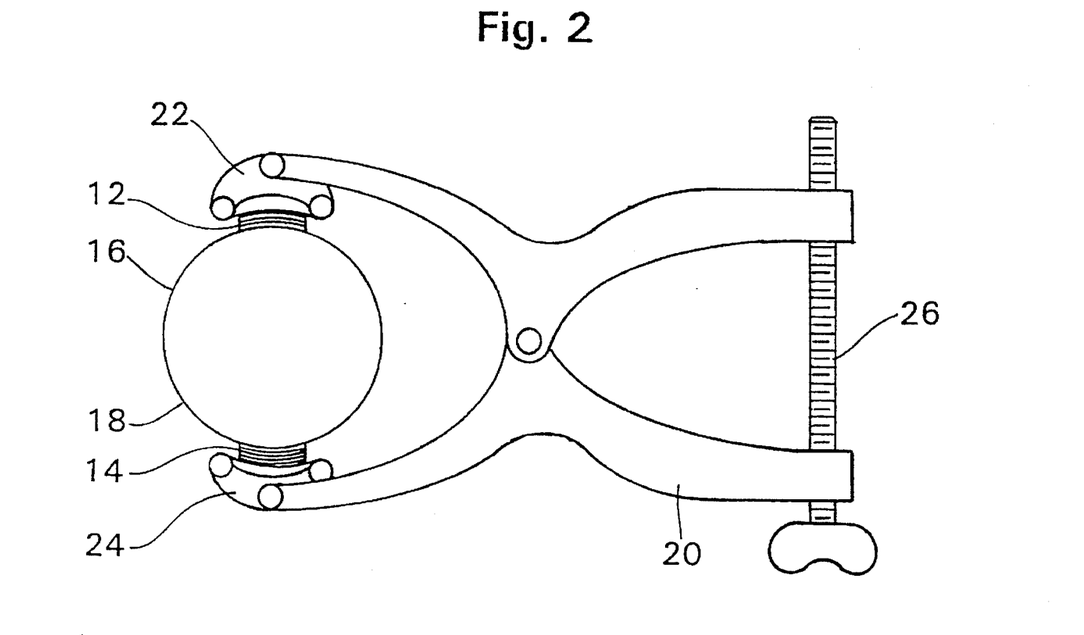
FIG. 2 shows a clamping tool for holding the two strain gage coupons of FIG. 1 in place on the valve stem as epoxy cures to form a bond between the coupons and the valve stem.

FIG. 2 shows a preferred embodiment of a clamping tool 20 for temporarily positioning the two strain gage coupons 12 and 14 exactly 180 degrees apart from each other on the valve stem surface 18, and for holding the coupons 12 and 14 in place with sufficient pressure to achieve a good thin glue line for the epoxy. The clamping tool 20 includes jaws 22 and 24 which are biased against the outer surface of the coupons 12 and 14, respectively. The clamping tool 20 also includes a screw 26 with a wing nut head for tightening the jaws 22 and 24 against the coupons 12 and 14. Preferably, the epoxy is one that can cure at room temperature and hold tight with good shear strength at the higher temperatures that might be experienced during the operation of the valve associated with the valve stem 16. In addition, the epoxy should be able to fill any slight imperfections which may be present in the valve stem surface 18. The preferred epoxy for this purpose is called "Titanium Putty," manufactured by Devcon Corporation of Danvers, Mass. However, other commercially available epoxies may also be used. The clamping tool 20 is designed to exert a high and uniform radial force against the coupons 12 and 14.

One important feature of the invention is that the size of the strain gage coupons 12 and 14 need not change for different valve stem diameters (within a relatively large range of diameters). This effective "one size fits all" feature provides a major advantage over the wrap-around coupon design described in the background where each particular diameter valve stem requires a different size coupon to provide the required 180 degree spacing. Accordingly, the clamping tool 20 and related clamping parts should preferably be sized so that the same clamping tool 20 works on a wide range of valve stem diameters, for example, from about ⅝" to about 6".

Figure 3:
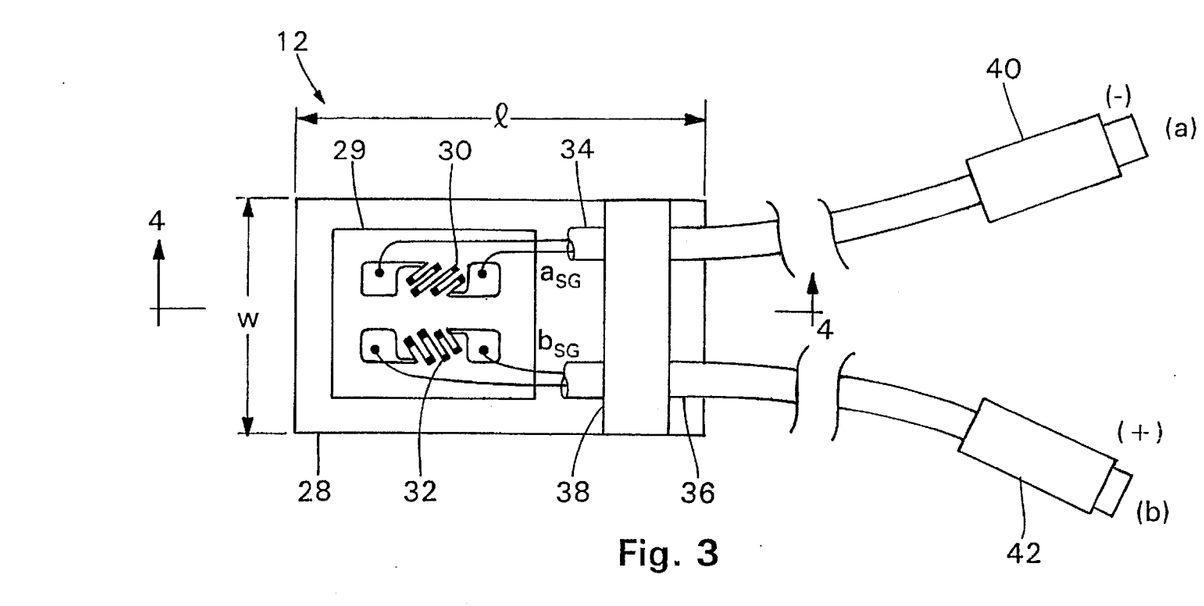
FIG. 3 is a top plan view of the coupon of FIG. 1, without its protective outer layer, showing the strain gage circuitry attached thereto.
Figure 4:
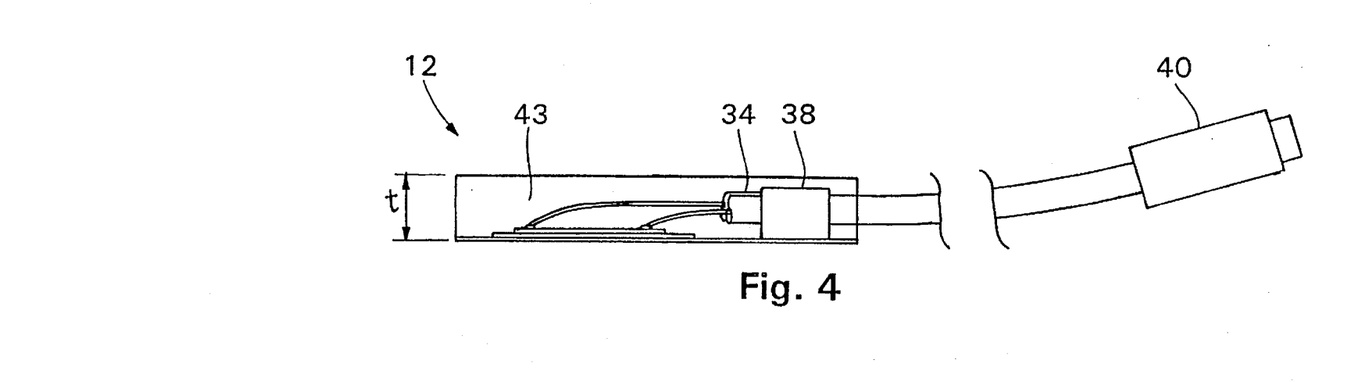
FIG. 4 is a sectional view of the coupon of FIG. 3 taken along line 4—4 of FIG. 3.

FIGS. 3 and 4 show a strain gage coupon 12 employed in the installation of FIG. 1. FIG. 3 is a top plan view of the coupon 12 showing the strain gage circuitry embedded or encapsulated therein. FIG. 4 is a sectional view of the coupon 12 taken along line 4—4 of FIG. 3. For illustration purposes, FIG. 3 shows the coupon 12 without the encapsulation material.

Figure 5:
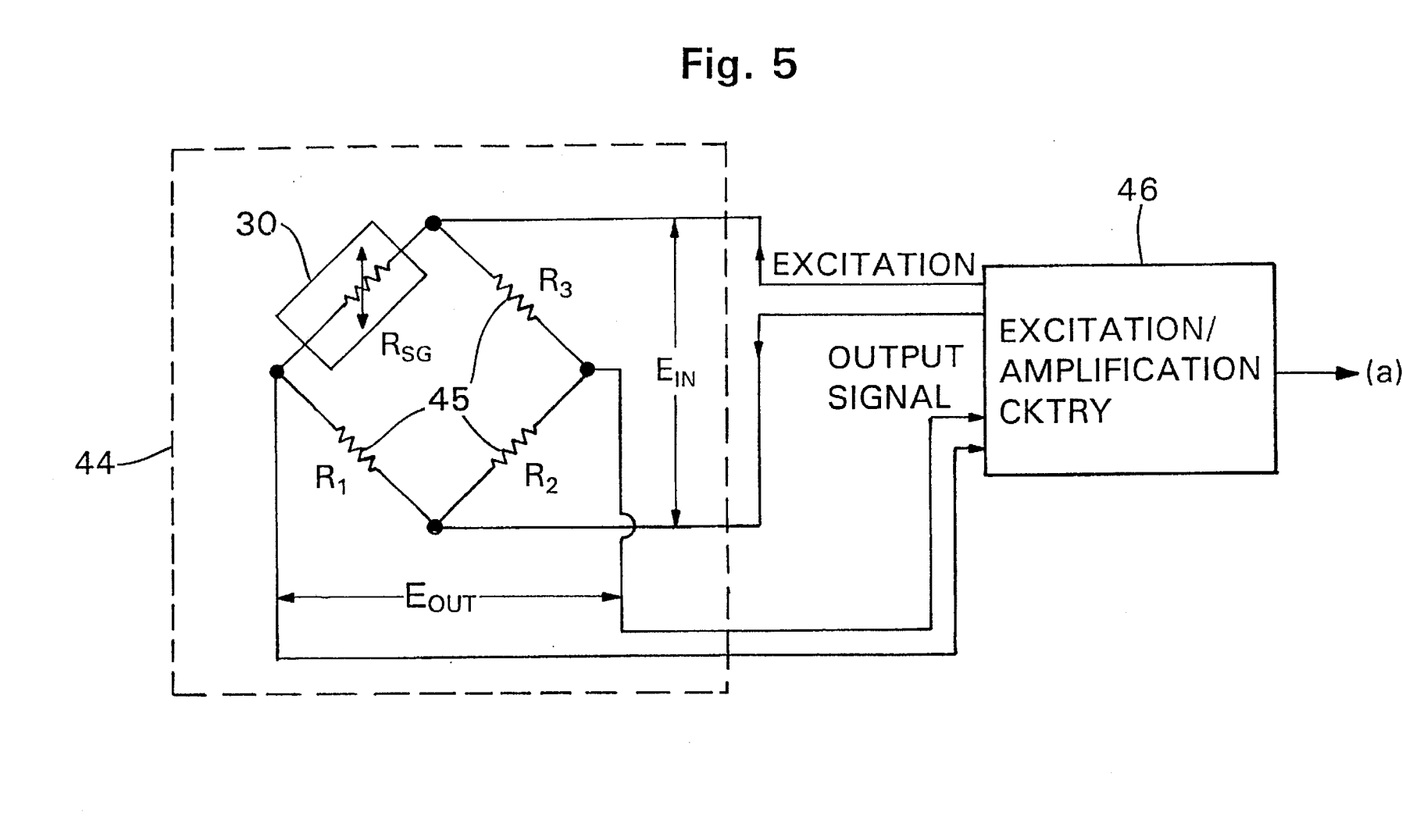
FIG. 5 is a Wheatstone bridge circuit associated with one of the strain gages in the coupon of FIG. 3, and shows, in schematic block diagram form, circuitry for exciting the bridge circuit and receiving an output voltage therefrom.

Referring to FIG. 3, the coupon 12 includes a substrate 28 having a base 29 with two identical metallic strain gages 30 and 32 bonded thereto. The metallic strain gages 30 and 32 are of the wire-grid type. The strain gages 30 and 32 are electrically isolated from each other and from the substrate 28. The strain gages 30 and 32 extend lengthwise along the base 28, parallel to, and spaced apart from each other. The wire grids of each strain gage 30 and 32 are oriented at a generally 45 degree angle to the lengthwise side, l, of the coupon 12. However, the wire grids of the strain gage 30 slope from a lower lefthand to upper righthand direction (or vice-versa), whereas the wire grids of the strain gage 32 slope from an upper lefthand to lower righthand direction (or vice-versa). The slopes are opposite to each other. In other words, the wire grids of the strain gage 30 are oriented at a +45 degree angle to the lengthwise side, l, of the coupon 12, whereas the wire grids of the strain gage 32 are oriented at a −45 degree angle to the lengthwise side, l, of the coupon 12. Looked at another way, the wire grids of the strain gage 30 have a positive slope with respect to the principal axis of the coupon 12, and the wire grids of the strain gage 32 have a negative slope with respect to the principal axis of the coupon 12 in a top view of the coupon 12. Looked at yet another way, the wire grids of the strain gage 30 are a mirror image of the wire grids of the strain gage 32. Leads are soldered to the ends of each strain gage 30 and 32. The leads run into protective cables 34 and 36, respectively, each cable containing a twisted pair of conductors. The cables are secured to the substrate 28 by a harness assembly 38 or other suitable means. The other end of each cable 34, 36 terminates in a connector 40, 42 inside of which are three resistors approximately equal in resistance to the strain gage, and these four elements are wired into the form of a Wheatstone bridge as shown in FIG. 5, the four corners of which are available at four of the pins (not shown) of the connectors 40, 42. The essential feature is just that one bridge circuit is being formed using one of the strain gages, and another bridge circuit is being formed using the other strain gage.

Referring to FIG. 4, the upper surface or strain gage side of the coupon 12 is preferably encapsulated with a flexible protecting material 43, such as silicone rubber.

In the preferred embodiment of the invention the wire grids are oriented at 45 degree angles to the lengthwise side, l, of the coupon 12. However, other orientation angles are within the scope of the invention.

To facilitate understanding of the signal processing aspect of the invention, a labeling convention is provided herein to identify signals from the coupons 12 and 14 based on the orientation of the strain gage wire grids. An output signal from a strain gage 30 oriented with wire grids in the +45 degree direction has a (−) label. An output signal from a strain gage 32 oriented with wire grids in the −45 degree direction has a (+) label.

Referring again to FIG. 1, it will now be understood that although the strain gage coupons 12 and 14 are identical, they are oriented on the valve stem surface 18 in a manner 180 degrees rotated from each other. That is, the coupon 14 is upside down with respect to the coupon 12. Accordingly, the raw strain gage output signals ($a_{SG}$) and ($c_{SG}$) have a (−) label, whereas the raw strain gage output signals ($b_{SG}$) and ($d_{SG}$) have a (+) label.

One type of coupon 12 suitable for use in the invention comprises a BeCu substrate having a width, w of about ⅜ inch, a length, l of about ½ inch and a thickness, t, of about 0.001 inches (1 mil), with two strain gages bonded thereto in a manner as shown in FIG. 3. However, the coupon 12 may be any reasonable size to accommodate its environment, and the substrate 28 may be of any relatively small thickness.

As noted above, the strain gages 30 and 32 are electrically isolated from the substrate 28 and from each other. However, they need not be isolated from each other if the remaining circuitry (i.e., bridge circuitry) is designed to handle a common connection point. The strain gages 30 and 32 are known in the art and commercially available. One suitable type of strain gage is the Model 062 TV, manufactured by Micro Measurements of Raleigh, N.C.

FIG. 5 is a schematic diagram of Wheatstone bridge circuit 44 associated with the strain gage 30, and its related excitation/amplification circuitry 46. The Wheatstone bridge circuit 44 includes the strain gage 30 and remaining circuit elements 45. The Wheatstone bridge circuit 44 is a single active arm type. The strain gage 30 forms the active resistor, $R_{SG}$, in the bridge. Three dummy resistors $R_1$, $R_2$ and $R_3$ of approximately equal resistance to the resistance of the strain gage 30 complete the bridge circuit. The leads from the strain gage 32, as well as the leads from the two strain gages associated with the other coupon 14, are also connected to separate but identical Wheatstone bridge circuits. Thus, there are four Wheatstone bridge circuits associated with an installation 10.

In use, each Wheatstone bridge circuit 44 ideally receives an identical excitation voltage, $E_{IN}$ from excitation/amplification, conditioning circuitry 46. The circuitry 46 receives the raw output signals ($a_{SG}$)–($d_{SG}$) and outputs conditioned and amplified output signals (a)–(d). FIG. 5 shows the processing of a single output signal (a) from the circuit 44. If the excitation voltage and/or amplification is different for a particular circuit 44; adjustments are made to compensate for the difference before any additional signal processing occurs. The remaining discussion presumes that all excitation voltages and amplifications are identical for each of the four Wheatstone bridge circuits 44.

Figure 6:
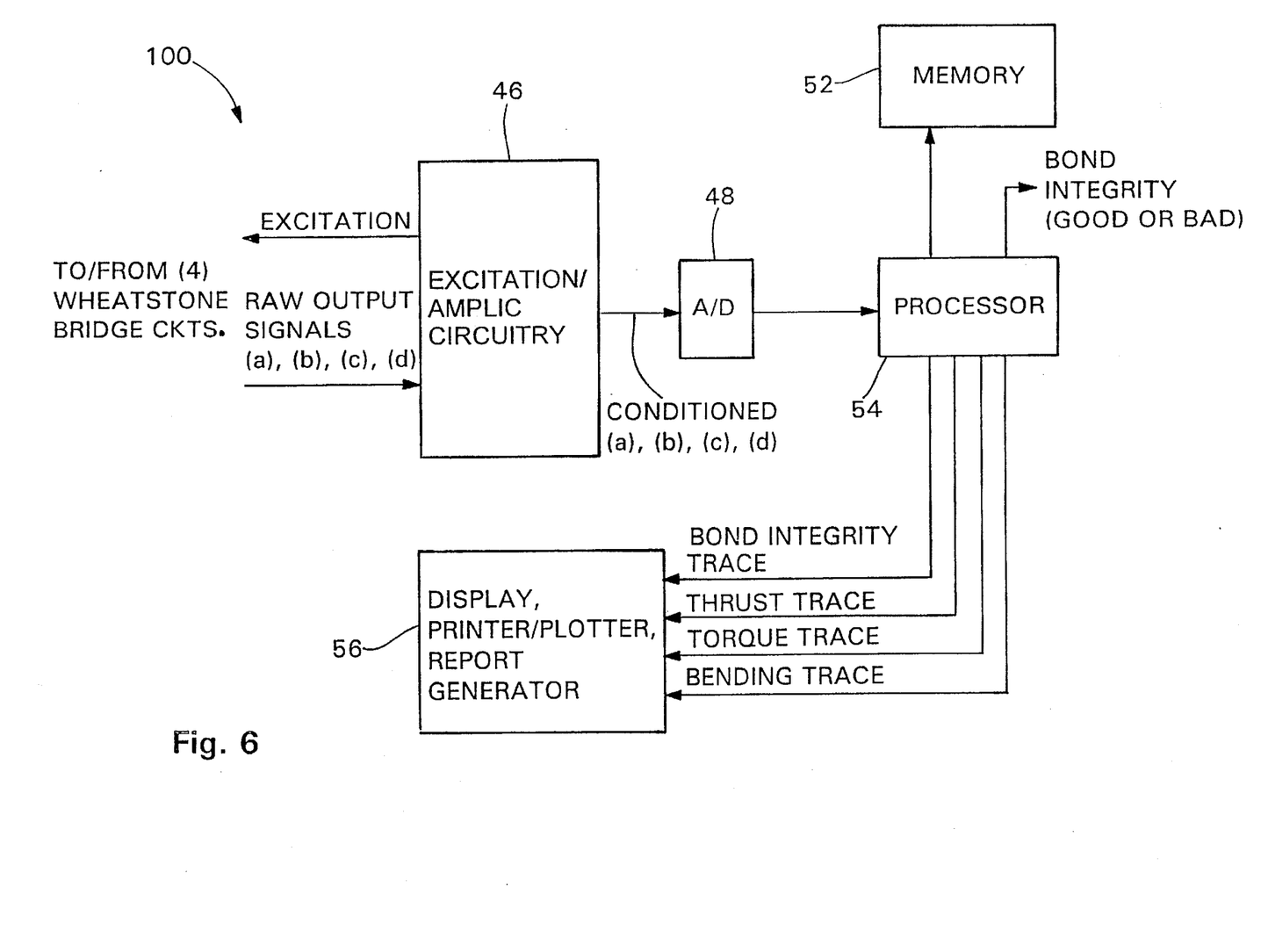
FIG. 6 is a schematic block diagram of apparatus for processing the strain gage output signals.

FIG. 6 is a schematic block diagram of a circuit 100 according to a preferred embodiment of the present invention for collecting and processing the output signals from each Wheatstone bridge circuit. The output of the circuitry 46 is connected to an A/D circuit 48 which converts the analog signals to digital signals. The output of the A/D circuit 48 is connected to a processor 54 which can be any type of microprocessor or general purpose digital computer. The processor 54 receives the output signals from the A/D circuit 48, stores the signals in a memory 52, and retrieves the values in the memory 52 for data processing purposes, described below.

Generally, the processor 54 performs four functions. First, the processor 54 employs the output signals to create a trace of the bond integrity between the coupons 12 and the valve stem surface 18 as the valve stem 16 is turned. From the trace, the processor 54 can determine whether the bond integrity is good or poor. If the bond is poor; no further data processing occurs. If the bond is good, the processor 54 combines the output signals in different ways to create traces of the thrust, torque and bending as the valve stem 16 is actuated. The traces and information related to the traces are sent to a display, printer/plotter and report generator 56.

Referring again to FIG. 1, the valve (not shown) associated with the valve stem 16 has left hand threads, as do most motor operated valves. Accordingly, when the actuator (not shown) exerts torque to push the valve disk into the valve seat, the strain gage elements associated with raw output signals ($b_{SG}$) and ($d_{SG}$) having wire grids in the −45 degree direction (the strain gages with a (+) label) increase in resistance due to the torque. Likewise, the strain gage elements associated with raw output signals ($a_{SG}$) and ($c_{SG}$) having wire grids in the +45 degree direction (the strain gages with a (−) label) decrease in resistance due to the torque. Furthermore, while the strain gage elements associated with raw output signals ($b_{SG}$) and ($d_{SG}$) are increasing in resistance and the strain gage elements associated with raw output signals ($a_{SG}$) and ($c_{SG}$) are decreasing in resistance due to the torque, all four are decreasing in resistance at the same time due to the compressive thrust. Finally, if there is any stem bending occurring, the strain gage elements associated with raw output signals ($a_{SG}$) and ($b_{SG}$) which are on the same coupon may increase in resistance due to bending, whereas the strain gage elements associated with raw output signals ($c_{SG}$) and ($d_{SG}$) on the other coupon will decrease in resistance due to bending, or possibly vice versa.

FIGS. 7A–7D show traces, labelled (a), (b), (c) and (d), respectively, associated with the strain gage output signals ($a_{SG}$)–($d_{SG}$). The traces are shown on a common time line. The traces are typical for a combination opening and closing stroke of a motor operated gate valve. It is assumed here that the traces were obtained utilizing identical excitation voltages and amplification gains, or in the case where different excitations and gains were utilized, the traces are presented after having already been multiplied by the appropriate constants as if the excitations and gains were the same.

Each of the traces (a), (b), (c) and (d) is a combination of all three strain gage resistance changing effects described above (i.e., torque, thrust and stem bending). An important feature of the invention is that the traces (a), (b), (c) and (d) are combinable in a unique way to create a new trace which is a measure of the integrity of the epoxy bond beneath each of the strain gage elements (i.e., how well the coupons are attached to the valve stem surface 18). This unique and very powerful feature allows one to avoid the difficult calibration procedure required in the prior art. Another important feature of the invention is that the traces (a), (b), (c) and (d) are combinable in other unique ways to create new traces of the thrust, torque and bending. That is, a thrust trace, torque trace and bending trace for the valve stem 16 can be extracted from the individual traces (a), (b), (c) and (d).

The theory behind determining the bond integrity trace is described next. Assume for the time being that the bond beneath each strain gage element is perfect. Then, any change in stem torque results in an equal change in the resistance of the four gages. If (b) and (d) go up, (a) and (c) will go down, or vice versa. Any change in stem thrust results in an equal change in the resistance of all four gages, all four going up or all four going down. Lastly, any change in stem bending results in an equal change in the resistance of the four gages, if (a) and (b) go up, (c) and (d) will go down, or vice versa. Since all the strain gage bridges have equal excitations and equal gains, an equal change in resistance of any of the gages results in an equal change in the output voltage of their bridges. Another way of stating all of the above is that during any stroking of the valve, any change in the output voltage of bridge (a), minus any change in the output voltage of bridge (b), minus any change in the output voltage of bridge (c), plus any change in the output voltage of bridge (d), must equal zero.

The bond integrity trace is formed therefore by subtracting traces (b) and (c) from traces (a) and (d) during the stroking of the valve. That is, the bond integrity trace equals (a)−(b)−(c)+(d). Each of the individual traces (a), (b), (c), and (d) may be expected to vary considerably during this time. The combined bond integrity trace may differ from zero, but it must remain constant throughout the stroke to prove the integrity of the bond beneath each strain gage element. The only way this combined trace can remain constant in the presence of a poor bond is if all of the bonds are defective by exactly the same percentage. That is, if only 50% of the strain in the valve stem surface beneath strain gage element (a) was being transmitted to strain gage element (a) because of a poor bond, then the only way the bond integrity trace could still remain constant would be if exactly 50% of the strain in the valve stem surface beneath each of the other strain gage elements were being transmitted to each of those strain gage elements. Since an installation 10 includes two separate coupons, each of which have two separate bond areas of concern, such an occurrence would be an incredible coincidence and highly unlikely to happen. Therefore, the existence of a constant bond integrity trace should be sufficient proof that all of the bonds are good.

Figure 7A:
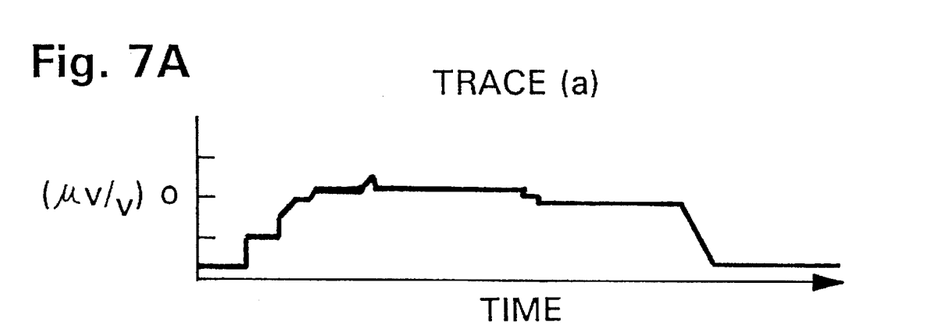
FIGS. 7A–7D show traces of the output signals (a), (b), (c) and (d) of FIG. 1, respectively, acquired during a typical opening and closing stroke of the valve associated with the valve stem.
Figure 7B:
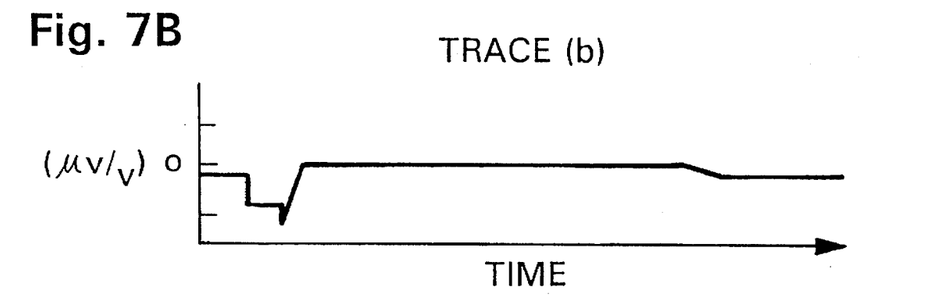
Figure 7C:
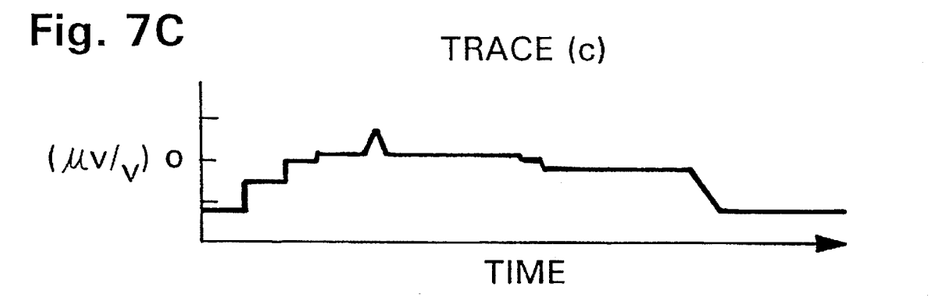
Figure 7D:
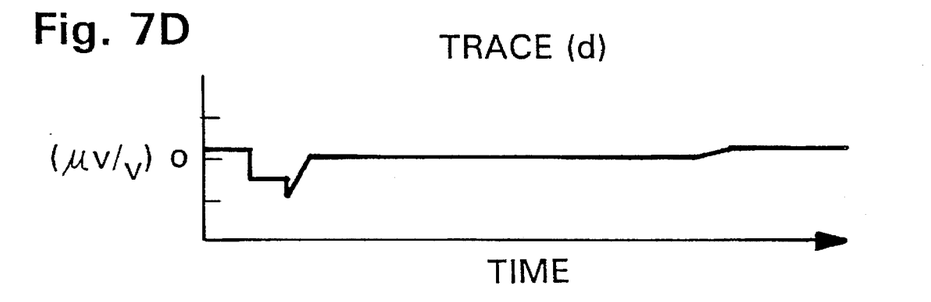
Figure 8:
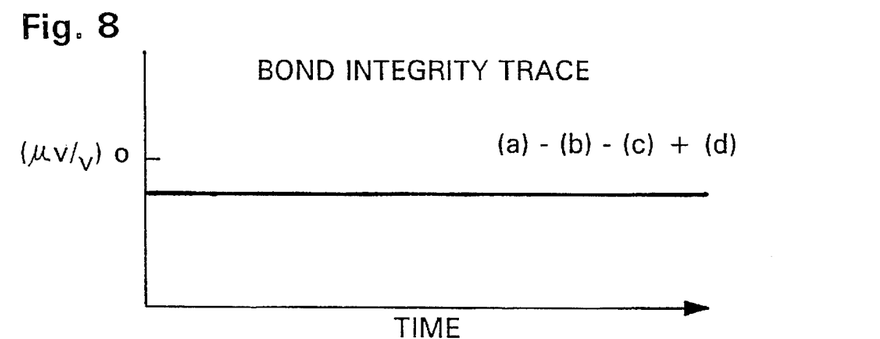
FIG. 8 shows a bond integrity trace formed from a combination of the output signals (a), (b), (c) and (d) acquired during the opening and closing stroke.

FIG. 8 shows a bond integrity trace computed from the traces (a)−(d) in FIGS. 7A−7D. Since the bond integrity trace remains at a constant value over time, the bonds are almost certainly good. Once the bonds are known to be good from the constancy of the bond integrity trace, then the thrust trace, torque trace, and bending trace over the same time period can be formed, and their scaled values can be relied upon with reasonable accuracy without having to calibrate by subjecting the valve stem to a known force and a known torque.

The thrust, torque, and bending traces are formed by combining the traces (a), (b), (c), and (d) in different ways. The values associated with the traces are referred to herein as "parameter values."

Figure 9:
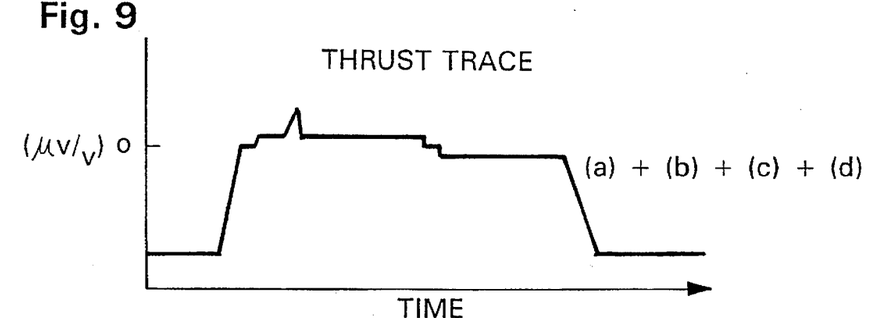
FIG. 9 shows a trace of thrust versus time formed from a combination of the output signals (a), (b), (c) and (d) acquired during the opening and closing stroke from a properly bonded strain gage installation.

FIG. 9 shows a thrust trace computed from the traces (a)−(d) in FIGS. 7A−7D composed of a plurality of instantaneous thrust parameter values. The thrust trace is formed by adding all four traces (a), (b), (c), and (d). The traces are added to get thrust because the equal thrust effect on each gage is either all positive or all negative.

Torque effects are also equal in each gage, but cancel out because torque effects that are positive in (a) and (c) will be negative in (b) and (d), and vice versa. Bending effects are also equal in each gage, but they too cancel out because bending effects that are positive in (a) and (b) will be negative in (c) and (d), and vice versa.

Figure 10:
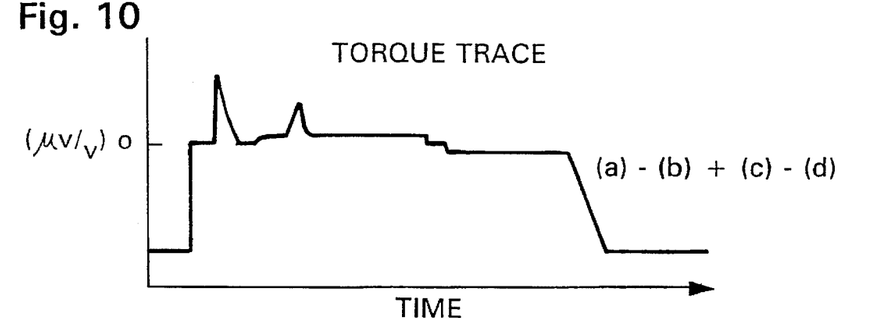
FIG. 10 shows a trace of torque versus time formed from a combination of the output signals (a), (b), (c) and (d) acquired during the opening and closing stroke from a properly bonded strain gage installation.

FIG. 10 shows a torque trace computed from the traces (a)−(d) in FIGS. 7A−7D composed of a plurality of instantaneous torque parameter values. The torque trace is formed by subtracting traces (b) and (d) from the sum of traces (a) and (c). That is, the torque trace is equal to (a)−(b)+(c)−(d). The traces are subtracted this way to get torque because, as indicated above, torque effects that are positive in (a) and (c) will be negative in (b) and (d), and vice versa. Thrust effects as stated above are equal and either all positive or all negative. They cancel out because (b) and (d) are being subtracted from (a) and (c). Bending effects cancel out because the bending effects in (a) and (b) are equal and the same sign and they are being subtracted from each other, and the bending effects in (c) and (d) are equal and the same sign and they are being subtracted from each other.

Figure 11:
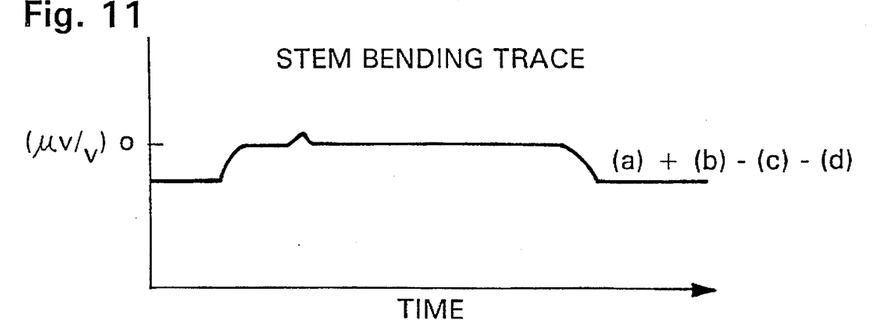
FIG. 11 shows a trace of stem bending versus time formed from a combination of the output signals (a), (b), (c) and (d) acquired during the opening and closing stroke from a properly bonded strain gage installation.

FIG. 11 shows a bending trace computed from the traces (a)−(d) in FIGS. 7A−7D composed of a plurality of instantaneous bending parameter values. The bending trace is formed by subtracting traces (c) and (d) from the sum of traces (a) and (b). That is, the bending trace is equal to (a)+(b)−(c)−(d). The traces are subtracted this way to get bending because as indicated above, bending effects that are positive in (a) and (b) will be negative in (c) and (d), and vice versa. Thrust effects as stated above are equal and either all positive or all negative. They cancel out because (c) and (d) are being subtracted from (a) and (b). Torque effects cancel out because the torque effects in (a) and (c) are equal and the same sign and they are being subtracted from each other, and the torque effects in (b) and (d) are equal and the same sign and they are being subtracted from each other.

The traces (a)−(d) are obtained in terms of pre-gain output voltage (microvolts), or preferably they may be obtained as shown in terms of pre-gain output voltage divided by the bridge excitation voltage (microvolts per volt, or ($\mu$v/v)). They can be left in these units for all of the above combining processes, with the bond integrity trace continuing to be left in terms of these units. The other combined traces, however, represent physical quantities, and they should be scaled accordingly. Each of the scalings can be done on the basis of a computation. It is necessary for the bonds beneath the strain elements to be good in order for the calculations to be accurate. Thus, only if the bond integrity trace is constant can one rely upon the computations as being an accurate representation of the actual situation.

The thrust trace should be scaled in terms of lbf. Because the unscaled trace is scaled in $\mu$v/v, a scaling factor is needed in terms of lbf/$\mu$v/v. This scaling factor, or inverse sensitivity factor, multiplies the result of adding traces (a), (b), (c), and (d), each scaled in $\mu$v/v. It is computed for the preferred 45 degree orientation as follows:

$$\left\{\frac{(Th)}{\left(\frac{E_{out}}{E_{in}}\right)}\right\} = \left[\frac{\pi d^2 E}{2.828 GF(1-\nu)}\right] \text{lbf}/\mu\text{v/v} \quad \text{(Equation 1)}$$

where:

Th is the axial thrust, or force, in the valve stem (lbf), $E_{out}$ is the sum of the output voltages of the four bridges (a), (b), (c) and (d) (μvolts), $E_{in}$ is the input voltage to the four bridges (a), (b), (c), and (d) (volts), d is the diameter of the valve stem (inches), E is the Modulus of Elasticity of the material of the valve stem ($\times 10^{-6}$ psi), GF is the Gage Factor of the strain gage material (dimensionless), and $\nu$ is Poisson's Ratio of the material of the valve stem (dimensionless).

The torque trace is to be scaled in terms of ft-lbf. Because the unscaled trace is scaled in μv/v, a scaling factor is needed in terms of ft-lbf/μv/v. This scaling factor, or inverse sensitivity factor, multiplies the result of subtracting traces (b) and (d) from the sum of (a) and (c), each of these scaled in μv/v. It is computed for the 45 degree orientation as follows:

$$\left\{\frac{(Tq)}{\left(\frac{E_{out}}{E_{in}}\right)}\right\} = \left[\frac{\pi d^3 E}{192 GF(1+\nu)}\right] \text{ft-lbf}/\mu\text{v/v} \quad \text{(Equation 2)}$$

where:

Tq is the torque in the valve stem (ft-lbf), $E_{out}$ is the output voltages of (a) and (c) minus the output voltages of (b) and (d) (μvolts), $E_{in}$ is the input voltage to the four bridges (a), (b), (c), and (d) (volts), d is the diameter of the valve stem (inches), E is the Modulus of Elasticity of the material of the valve stem ($\times 10^{-6}$ psi), GF is the Gage Factor of the strain gage material (dimensionless), and $\nu$ is Poisson's ratio of the material of the valve stem (dimensionless).

The bending trace is to be scaled in terms of in-lbf. Because the unscaled trace is scaled in μv/v, a scaling factor is needed in terms of in-lbf/μv/v. This scaling factor, or inverse sensitivity factor, multiplies the result of subtracting traces (c) and (d) from the sum of (a) and (b), each scaled in μv/v. It is computed for the 45 degree orientation as follows:

$$\left\{\frac{(B)}{\left(\frac{E_{out}}{E_{in}}\right)}\right\} = \left[\frac{\pi d^3 E}{22.624 GF(1-\nu)}\right] \text{in-lbf}/\mu\text{v/v} \quad \text{(Equation 3)}$$

where:

B is the component of the bending moment in the valve stem, orthogonal to the gages (in-lbf), $E_{out}$ is the output voltages of (a) and (b) minus the output voltages of (c) and (d) (μvolts), $E_{in}$ is the input voltage to the four bridges (a), (b), (c), and (d) (volts), d is the diameter of the valve stem (inches), E is the Modulus of Elasticity of the material of the valve stem ($\times 10^{-6}$ psi), GF is the Gage Factor of the strain gage material (dimensionless), and $\nu$ is Poisson's ratio of the material of the valve stem (dimensionless).

When stem bending exists, the magnitude of the bending trace is greatest when the axis of bending is orthogonal to the gages. This makes the bending trace very useful diagnostically. The trace indicates bending fixed in the stem, as from a bent stem condition where the bending simply increases in magnitude as the valve seats. And it can distinguish this from bending rotating around with the drive sleeve, as would occur for example from a cocked upper drive sleeve bearing. In this latter case, as the valve seats, the bending trace appears to vary sinusoidally at the drive sleeve frequency.

The thrust, torque, and bending traces have been shown to have computed scaling factors that can be used when the bonds are good, as verified by the bond integrity trace. Regarding the bond integrity trace itself, it must be stated how constant it needs to be in order to be able to rely on the bonds, and on these computed scaling factors, thereby avoiding very difficult calibration procedures. Acceptable constancy of the bond integrity trace can be gauged as follows: For each of the uncombined traces, (a), (b), (c), and (d), find a region of maximum change during the valve stroke. These regions may be different for each of these traces. For each region of maximum change, acceptable constancy is proven if the corresponding change in the bond integrity trace over that region is less than 5% of the change in the particular uncombined trace. With acceptable constancy, the bonds are shown to be good, and the computed scale factors can be used. All these traces are scaled alike, in μv/v, so the change comparisons are straightforward.

For valve stems on motor operated valves, the zero thrust point and zero torque point are obvious by inspection of the thrust and torque traces. It is a small plateau region where the stem is transitioning from one side of the stem nut to the other and therefore no thrust or torque is being transmitted to, or by, the stem. No bending is transmitted here either. If a point in this region is marked, and all the traces are rezeroed at the marked point, in addition to correctly indicating changes in torque, thrust, and bending, the traces indicate correct absolute values.

All of the calculations above may be performed in the processor 54 of FIG. 6.

In the preferred embodiment of the invention, four separate strain gage bridges are formed using just four individual strain gages. This is the easiest, and therefore preferred configuration. The four bridges can also be formed using more than one strain gage per bridge, and still be within the scope of the invention. In the preferred embodiment, four individual strain gage bridges are formed whose outputs, within the special proviso of having good bonds beneath all of the strain gage elements, all change equally due to a thrust change, all change equally due to a torque change, and all change equally due to a bending change. However, the polarities of these equal changes are different. While all four bridge outputs either all increase or all decrease for a thrust change, two of the bridge outputs increase for a torque change while the other two decrease, and still different bridge output pairs increase and decrease for a bending change. This is what allows them to be separated and allows the bond integrity trace to be formed.

If the bridge output changes are truly of equal amplitude, considering the thrust changes separately, the torque changes separately, and the bending changes separately, then two particular outputs can be subtracted from the sum of the other two to always yield the non-changing bond integrity trace, and another two particular outputs can be subtracted from the sum of the other two to yield the torque trace, and still another two particular outputs can be subtracted from the sum of the other two to yield the bending trace, and finally all four outputs can be summed to yield the thrust trace. If the proviso of having good bonds beneath all of the strain gage elements is not met, then the assumption of equal amplitude changes will not be met, and the bond integrity trace will not be constant.

In the simplest and preferred embodiment, only one strain gage is used for each bridge. In such a single active gage situation, there is a degree of nonlinearity. To analyze how much nonlinearity might be expected, a review of expected physical parameters reveals a maximum bridge output of about 1,000 μv/v. At this level the nonlinearity is still much less than 1% and is not considered to be a problem. Also with only one gage per bridge, resistance changes caused by thermal changes need to be explored. In this situation, one might expect equal thermal changes on each gage and therefore equal resistance changes. The situation, if it exists, is only detrimental for the thrust trace. The torque trace, bending trace, and bond integrity trace will cancel out the effect due to their subtracting of outputs. But for the sake of the thrust trace, the attainment of thermal equilibrium before acquiring data is desirable. All things considered, the problems encountered by using just one gage per bridge are more than offset by the simplicity.

The embodiment of the invention described herein employs wire-grid strain gages. However, other types of strain gages are within the scope of the invention so long as their sensing axes are oriented in the same manner as described herein. Furthermore, the methods of employing the strain gages merely require the use of at least four strain gages oriented generally as described and shown in FIGS. 1 and 3. The strain gages need not be associated with coupons, or be arranged in pairs on a coupon. The strain gages also need not be proximate to each other, nor do diametrically opposite gages need to be in the same plane P, so long as their sensing axes are oriented as described and shown in FIGS. 1 and 3.

From the foregoing description of a preferred embodiment, it can be seen that the present invention comprises a method and system for measuring thrust and torque on a rod or valve stem which does not require calibration against a known thrust or torque. It will be appreciated by those skilled in the art that changes or modifications could be made to the above-described embodiment without departing from the broad inventive concepts of the invention. It should be appreciated, therefore, that the present invention is not limited to the particular embodiment disclosed but is intended to cover all embodiments within the scope or spirit of the appended claims.

I claim:

1. A method for detecting the integrity of a bond between strain gages and the circumferential surface of a rod having an axis and an intended use, the method comprising the steps of:

(a) bonding at least four strain gages to the surface of the rod, first and second strain gages being on one side of the surface of the rod and third and fourth strain gages being on the opposite side of the surface of the rod with all four gages being oriented at the same angle with respect to the rod axis, the angle being different than 0° and 90°, the first and third strain gages having a sensing axis which slopes from a lower left to upper right direction, the second and fourth strain gages having a sensing axis which slopes from an upper left to lower right direction, each of the strain gages being connected to a separate strain gage bridge circuit;

(b) using the rod for the intended use;

(c) outputting from the strain gage bridge circuits a plurality of instantaneous first, second, third and fourth output signals resulting from using the rod, each output signal being associated with the first, second, third and fourth strain gage, respectively;

(d) calculating a plurality of instantaneous bonding values from the output signals equal to the sum of the first signal and the fourth signal, minus the sum of the second signal and the third signal; and (e) detecting whether the instantaneous bonding values are constant, constant bonding values indicating that the bond integrity of the strain gages is good and nonconstant bonding values indicating that the bond integrity of at least one of the strain gages is poor.

2. A method according to claim 1 further comprising the step of:

(f) generating a graphical bond integrity trace from the plurality of instantaneous bonding values.

3. A method according to claim 1 wherein the sensing axis of the first and third strain gage slopes at an angle of about +45 degrees, and the sensing axis of the second and fourth strain gage slopes at an angle of about −45 degrees.

4. A method according to claim 1 wherein the rod is an unthreaded portion of a valve stem and step (a) comprises bonding the strain gages to the valve stem portion.

5. A method according to claim 1 wherein the first and second strain gages are located on a first coupon, and the third and fourth strain gages are located on a second coupon, wherein step (a) comprises bonding the first and second coupons to the surface of the rod.

6. A method for collecting thrust-related information about a rod having an axis and an intended use, the method comprising the steps of:

(a) bonding at least four strain gages to the circumferential surface of the rod, first and second strain gages being on one side of the surface of the rod and third and a fourth strain gages being on the opposite side of the surface of the rod with all four gages being oriented at the same angle with respect to the rod axis, the angle being different than 0° and 90°, the first and third strain gages having a sensing axis which slopes from a lower left to upper right direction, the second and fourth strain gages having a sensing axis which slopes from an upper left to lower right direction, each of the strain gages being connected to a separate strain gage bridge circuit;

(b) using the rod for the intended use;

(c) outputting from the strain gage bridge circuits a plurality of instantaneous first, second, third and fourth output signals resulting from using the rod, each output signal being associated with the first, second, third and fourth strain gage, respectively;

(d) calculating a plurality of instantaneous bonding values from the output signals equal to the sum of the first signal and the fourth signal, minus the sum of the second signal and the third signal;

(e) detecting whether the instantaneous bonding values are constant, constant bonding values indicating that the bond integrity of the strain gages is good and nonconstant bonding values indicating that the bond integrity of at least one of the strain gages is poor; and, if the instantaneous values are constant;

(f) calculating a plurality of instantaneous thrust parameter values from the output signals, the thrust parameter values being equal to the sum of the first, second, third and fourth output signals.

7. A method according to claim 6 further comprising the step of:

(g) generating a plurality of instantaneous axial thrust values by multiplying each of the plurality of instantaneous thrust parameter values by a predetermined scaling factor;

(h) generating a graphical trace of thrust versus time from the plurality of instantaneous thrust values.

8. A method according to claim 7 further comprising the step of:

(i) locating on the trace of step (h) a region of zero thrust and rezeroing the trace at a point in the zero region, thereby causing the trace to provide correct absolute thrust values.

9. A method according to claim 8 wherein the scaling factor is a function of at least the orientation angle of each of the strain gages, the Modulus of Elasticity and Poisson's Ratio of the rod material, the diameter of the rod, and the Gage Factor of the strain gage material.

10. A method according to claim 6 wherein the rod is an unthreaded portion of a valve stem and step (a) comprises bonding each of the strain gages to the valve stem portion.

11. A method according to claim 6 wherein the first and second strain gages are located on a first coupon, and the third and fourth strain gages are located on a second coupon, wherein step (a) comprises bonding the first and second coupons to the surface of the rod.

12. A method for collecting torque-related information about a rod having an axis and an intended use, the method comprising the steps of:

(a) bonding at least four strain gages to the circumferential surface of the rod, first and second strain gages being on one side of the surface of the rod and third and a fourth strain gages being on the opposite side of the surface of the rod with all four gages being oriented at the same angle with respect to the rod axis, the angle being different than 0° and 90°, the first and third strain gages having a sensing axis which slopes from a lower left to upper right direction, the second and fourth strain gages having a sensing axis which slopes from an upper left to lower right direction, each of the strain gages being connected to a separate strain gage bridge circuit;

(b) using the rod for the intended use;

(c) outputting from the strain gage bridge circuits a plurality of instantaneous first, second, third and fourth output signals resulting from using the rod, each output signal being associated with the first, second, third and fourth strain gage, respectively;

(d) calculating a plurality of instantaneous bonding values from the output signals equal to the sum of the first signal and the fourth signal, minus the sum of the second signal and the third signal;

(e) detecting whether the instantaneous bonding values are constant, constant bonding values indicating that the bond integrity of the strain gages is good and nonconstant bonding values indicating that the bond integrity of at least one of the strain gages is poor; and, if the instantaneous bonding values are constant, (f) calculating a plurality of instantaneous torque parameter values from the output signals, the parameter values being equal to the sum of the first and third output signals minus the sum of the second and fourth output signals.

13. A method according to claim 12 further comprising the step of:

(g) generating a plurality of instantaneous axial torque values by multiplying each of the plurality of instantaneous torque parameter values by a predetermined scaling factor;

(h) generating a graphical trace of torque versus time from the plurality of instantaneous torque values.

14. A method according to claim 12 further comprising the step of:

(i) locating on the trace of step (h) a region of zero torque and rezeroing the trace at a point in the zero region, thereby causing the trace to provide correct absolute thrust values.

15. A method according to claim 14 wherein the scaling factor is a function of at least the orientation angle of each of the strain gages, the Modulus of Elasticity and Poisson's Ratio of the rod material, the diameter of the rod, and the Gage Factor of the strain gage material.

16. A method according to claim 12 wherein the rod is an unthreaded portion of a valve stem and step (a) comprises bonding each of the strain gages to the valve stem portion.

17. A method according to claim 12 wherein the first and second strain gages are located on a first coupon, and the third and fourth strain gages are located on a second coupon, wherein step (a) comprises bonding the first and second coupons to the surface of the rod.

18. A method for collecting bending-related information about a rod having an axis and an intended use, the method comprising the steps of:

(a) bonding at least four strain gages to the circumferential surface of the rod, first and second strain gages being on one side of the surface of the rod and third and a fourth strain gages being on the opposite side of the surface of the rod with all four gages being oriented at the same angle with respect to the rod axis, the angle being different than 0° and 90°, the first and third strain gages having a sensing axis which slopes from a lower left to upper right direction, the second and fourth strain gages having a sensing axis which slopes from an upper left to lower right direction, each of the strain gages being connected to a separate strain gage bridge circuit;

(b) using the rod for the intended use;

(c) outputting from the strain gage bridge circuits a plurality of instantaneous first, second, third and fourth output signals resulting from using the rod, each output signal being associated with the first, second, third and fourth strain gage, respectively;

(d) calculating a plurality of instantaneous bonding values from the output signals equal to the sum of the first signal and the fourth signal, minus the sum of the second signal and the third signal;

(e) detecting whether the instantaneous bonding values are constant, constant bonding values indicating that the bond integrity of the strain gages is good and nonconstant bonding values indicating that the bond integrity of at least one of the strain gages is poor; and, if the instantaneous bonding values are constant;

(f) calculating a plurality of instantaneous bending parameter values from the output signals, the parameter values being equal to the sum of the first and second output signals, minus the sum of the third and fourth output signals.

19. A method according to claim 18 further comprising the step of:

(g) generating a plurality of instantaneous bending moments by multiplying each of the plurality of instantaneous bending parameter values by a predetermined scaling factor;

(h) generating a graphical trace of bending versus time from the plurality of instantaneous bending values.

20. A method according to claim 18 further comprising the step of:

(i) locating on the trace of step (h) a region of zero bending moments and rezeroing the trace at a point in the zero region, thereby causing the trace to provide correct absolute bending moments.

21. A method according to claim 20 wherein the scaling factor is a function of at least the orientation angle of each of the strain gages, the Modulus of Elasticity and Poisson's Ratio of the rod material, the diameter of the rod, and the Gage Factor of the strain gage material.

22. A method according to claim 18 wherein the rod is an unthreaded portion of a valve stem and step (a) comprises bonding each of the strain gages to the valve stem portion.

23. A method according to claim 18 wherein the first and second strain gages are located on a first coupon, and the third and fourth strain gages are located on a second coupon, wherein step (a) comprises bonding the first and second coupons to the surface of the rod.

24. A method for collecting thrust-related, torque-related and bending-related information about a rod having an axis and an intended use, the method comprising the steps of:

(a) bonding at least four strain gages to the circumferential surface of the rod, first and second strain gages being on one side of the surface of the rod and third and a fourth strain gages being on the opposite side of the surface of the rod with all four gages being oriented at the same angle with respect to the rod axis, the angle being different than 0° and 90°, the first and third strain gages having a sensing axis which slopes from a lower left to upper right direction, the second and fourth strain gages having a sensing axis which slopes from an upper left to lower right direction, the sensing axes being opposite of each other, each of the strain gages being connected to a separate strain gage bridge circuit;

(b) using the rod for the intended use;

(c) outputting from the strain gage bridge circuits a plurality of instantaneous first, second, third and fourth output signals resulting from using the rod, each output signal being associated with the first, second, third and fourth strain gage, respectively;

(d) calculating a plurality of instantaneous bonding values from the output signals equal to the sum of the first signal and the fourth signal, minus the sum of the second signal and the third signal;

(e) detecting whether the instantaneous bonding values are constant, constant bonding values indicating that the bond integrity of the strain gages is good and nonconstant bonding values indicating that the bond integrity of at least one of the strain gages is poor; and, if the instantaneous bonding values are constant;

(f) calculating from the output signals as the rod is used         (i) a plurality of instantaneous thrust parameter values being equal to the sum of the first, second, third and fourth output signals,         (ii) a plurality of instantaneous torque parameter values being equal to the sum of the first and third output signals, minus the sum of the second and fourth output signals, and         (iii) a plurality of instantaneous bending parameter values being equal to the sum of the first and second output signals, minus the sum of the third and fourth output signals.

25. A method according to claim 24 further comprising the step of:

(g) generating a plurality of instantaneous axial thrust values, instantaneous axial torque values and instantaneous bending moments by multiplying the thrust parameter values, the torque parameter values and the bending parameter values respectively by predetermined scaling factors;

(h) generating a graphical trace of thrust, torque and bending versus time from the plurality of instantaneous thrust, torque and bending values.

26. A method according to claim 25 further comprising the step of:

(i) locating on the traces generated in step (h) a region of zero thrust, zero torque and zero bending, and     (j) rezeroing the traces at a point in the zero region, thereby causing each of the traces to provide correct absolute values.

* * * * *